UNITED STATES PATENT OFFICE.

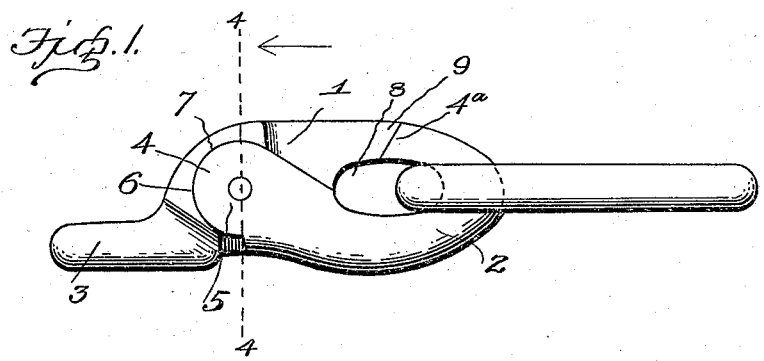
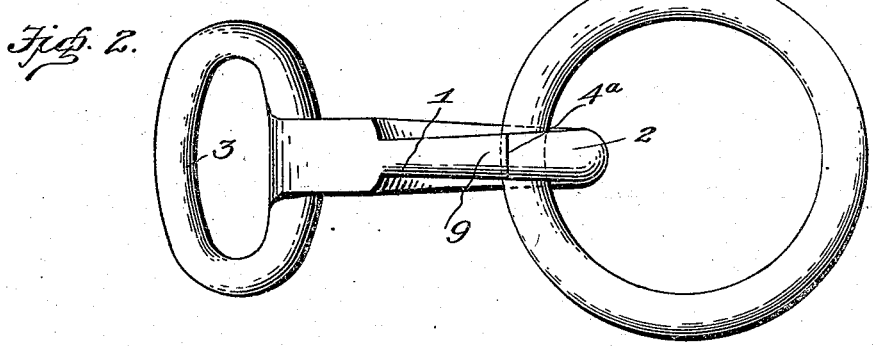
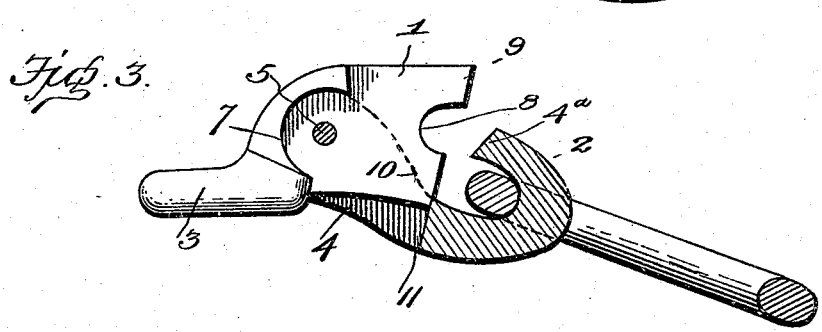
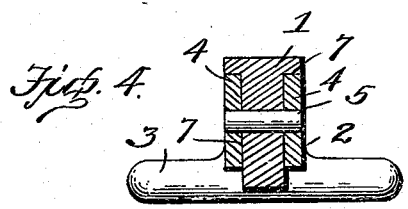

THOMAS T. MORROW, OF RAY, INDIANA.

SNAP-HOOK.

939,531.

Specification of Letters Patent.

Patented Nov. 9, 1909.

Application filed June 15, 1908. Serial No. 438,653.

*To all whom it may concern:*

Be it known that I, THOMAS T. MORROW, a citizen of the United States, residing at Ray, in the county of Steuben and State of Indiana, have invented certain new and useful Improvements in Snap-Hooks; and I do declare the following to be a full, clear, and exact description of the invention, such as will enable others skilled in the art to which it appertains to make and use the same.

My invention relates to improvements in snap hooks designed more particularly for harness although applicable for other purposes where such contrivances may be of use.

It has for its object to provide a compact and simple construction of parts; to dispense with the use of a spring ordinarily employed in connection with such hooks; to bring the draft or strain wholly on the hook in front of the tongue or shank; to provide for the locking action between the strap or harness ring and the hook as against the casual or accidental displacement of the former, and to carry out these ends in a simple, inexpensive and effective manner.

In the accompanying drawings illustrating the preferred embodiment of my invention; Figure 1 is a side elevation thereof; Fig. 2 is a plan view of the same; Fig. 3 is a side elevation, partly in section, of the invention; Fig. 4 is a vertical section taken on the line 4—4 of Fig. 1.

In practicing my invention I provide a tongue or shank member 1 and a hook member 2, the former being adapted for suitable attachment or connection with a strap or rein or other part of a harness or like outfit, the same having a loop 3 or like means for that purpose. Said hook member is bifurcated and provided with prongs or branches 4, 4 having pivotal connection as at 5 with the shank or tongue member 1 and embracing the latter. The inner ends of said branches or prongs are rounded or convex as at 6 and are received by correspondingly shaped recesses 7 formed in lateral extensions of said shank member thus providing for the letting of said prongs or branches into said shank member flush with the outer lateral surfaces thereof at that point. Said tongue or shank member has formed in its forward end a complementary notch 8 adapted to aline with the inner surface of said hook member and conjointly form the loop or opening for receiving the harness or rein ring as will be noted, the forward end of one arm or prong 9 thus formed upon said shank or tongue member, abutting on an incline or bevel with the rear end of the beak of said hook member as at 4ª. Said shank or tongue member has the other branch or arm 10 thereof adapted to abut a shoulder 11 of said hook member formed by recessing the latter as in providing said hook member with the arms or branches first described and which shoulders and abutting surfaces of said arm 10 and shoulder 11 are also formed upon inclined or beveled lines, the face of arm 10 being inclined downwardly and inwardly and that of shoulder 11 being downwardly and outwardly inclined, whereby it will be noted that as said hook member is depressed as in opening the snap, the downward movement of said hook member will be limited or restricted by the lower end of the beveled faces of said arm 10 engaging the upper end of the beveled shoulder 11 and the hook thus be prevented from escaping from the tongue or shank member at that point. By this arrangement it will be noted that even though the hook member should assume the last noted position the ring will yet be retained in place of said hook member and consequently accidental displacement will be prevented, whether the link be under stress or hanging loosely in said hook member, the space between the inner end of the beak 4ª and the upper end of arm 10 being insufficient to permit the link to pass therethrough. Also it is observed that by this arrangement the use of a spring as employed in the ordinary form of device of this character is dispensed with and that in order to displace or remove the ring it is necessary to first move said ring rearwardly and into the notch of the tongue or shank member and while retained therein to depress said hook member when said ring may be displaced. First importance is attached to this arrangement of parts, especially as relates to opposing the beveled surfaces of said shank and said hook member so as to be brought into contact with each other. Upon the depressing of said hook member as above noted, the casual or accidental displacement of said ring is effectually prevented.

In addition to dispensing with the use of a spring as also already indicated, it is also remarked that a device of this character of very compact and simple construction is provided and one which is highly effective for its intended purpose. Also that the draft delivered upon the rein or other strap attachment aids in the retention of the hook in closed or effective position and that by reason of the forming of the shank member with shoulders, a housing or seat is provided for the rear pivoted end of the hook member, thus adding to the strength and durability of the device.

It will be noted that the hook member 2 is formed with a sufficient recess to accommodate a ring and when said member is moved against the shank member, the arm 10 of said member securely confines the ring carried by said hook member and that said arm 10 is formed of sufficient width to prevent the ring from interfering with the free movement of the shank on the hook member or becoming wedged between said arm and said hook member.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

I claim as my invention:—

1. A snap hook comprising an attaching tongue or shank member provided with a notch or recess in its front end forming vertically spaced arms, the front ends of which are beveled or inclined downwardly and inwardly, the incline of one arm being in a plane at an angle to the incline of the other arm, and a hook member having its rear end bifurcated to receive said shank member and pivotally connected thereto, said hook member having a shoulder arranged between the arms thereof with its face inclined downwardly and outwardly and adapted to engage the inclined end of the lower arm of the shank member, the free end of the hook beak being beveled downwardly and outwardly to engage the end of the upper shank arm.

2. A snap hook comprising an attaching or shank member having a loop at one end arranged at right angles thereto and recesses at opposite sides thereof with curved walls at the rear ends of said recesses, the front end of said shank member having a recess therein forming longitudinally extending arms arranged above and below the recess, the front end of said arms being inclined or beveled downwardly and inwardly at different angles, the lower arm being longer than the upper and having a greater inclination, and a hook member having its rear end bifurcated to receive said shank member, with the terminations of said bifurcated ends rounded to fit against the curved rear walls of the side recesses of said shank member and pivoted to said shank, said hook member having a shoulder between the arms thereof with its face inclined downwardly and outwardly and adapted to engage the inclined end of the lower arm of the shank member, the free end of the hook beak being beveled downwardly and outwardly to engage the beveled end of the upper shank arm.

In testimony whereof I have hereunto set my hand in presence of two subscribing witnesses.

THOMAS T. MORROW.

Witnesses:
ROLLO THOMPSON,
F. E. TAFFNER.